United States Patent
Archer, III

(10) Patent No.: US 10,570,038 B2
(45) Date of Patent: *Feb. 25, 2020

(54) METHOD FOR TREATING SULFIDES IN WASTE STREAMS

(71) Applicant: BILL ARCHER, LLC, Charlotte, NC (US)

(72) Inventor: William Moseley Archer, III, Charlotte, NC (US)

(73) Assignee: BILL ARCHER, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,123

(22) Filed: Apr. 29, 2019

(65) Prior Publication Data

US 2019/0248684 A1    Aug. 15, 2019

Related U.S. Application Data

(60) Continuation of application No. 16/165,010, filed on Oct. 19, 2018, now Pat. No. 10,315,940, which is a division of application No. 14/854,403, filed on Sep. 15, 2015, now Pat. No. 10,112,853.

(51) Int. Cl.

| | |
|---|---|
| *C01B 17/05* | (2006.01) |
| *C01B 17/64* | (2006.01) |
| *C01B 17/96* | (2006.01) |
| *C02F 1/72* | (2006.01) |
| *C02F 1/74* | (2006.01) |
| *E21B 21/06* | (2006.01) |
| *C02F 101/10* | (2006.01) |
| *C02F 103/10* | (2006.01) |
| *C02F 103/18* | (2006.01) |
| *C02F 103/36* | (2006.01) |

(52) U.S. Cl.
CPC .............. *C02F 1/725* (2013.01); *C01B 17/05* (2013.01); *C01B 17/64* (2013.01); *C01B 17/96* (2013.01); *C02F 1/74* (2013.01); *C02F 2101/101* (2013.01); *C02F 2103/10* (2013.01); *C02F 2103/18* (2013.01); *C02F 2103/365* (2013.01); *C02F 2303/02* (2013.01); *C02F 2305/02* (2013.01); *E21B 21/068* (2013.01)

(58) Field of Classification Search
CPC ......... C01B 17/05; C01B 17/64; C01B 17/96; C02F 1/725; C02F 1/74; C02F 2103/10; C02F 2103/18; C02F 2103/365; C02F 2303/02; C02F 2305/02; E21B 21/068
See application file for complete search history.

(56) References Cited

U.S. PATENT DOCUMENTS

| | | | |
|---|---|---|---|
| 2,897,140 | A | 7/1959 | Gislon et al. |
| 3,104,951 | A | 9/1963 | Urban et al. |
| 3,226,320 | A | 12/1965 | Meuley et al. |
| 3,913,673 | A | 10/1975 | Barber |
| 4,076,621 | A | 2/1978 | Hardison |
| 4,229,747 | A | 10/1980 | Hwang |
| 4,615,714 | A | 10/1986 | Turk et al. |
| 4,992,078 | A | 2/1991 | Meszaros |
| 5,009,869 | A | 4/1991 | Weinberg et al. |
| 5,470,356 | A | 11/1995 | Meszaros |
| 5,585,051 | A | 12/1996 | Hosie et al. |
| 5,922,087 | A | 7/1999 | Nishioka et al. |
| 5,948,122 | A | 9/1999 | Xu et al. |
| 5,961,670 | A | 10/1999 | Cote et al. |
| 8,962,715 | B2 | 2/2015 | Engelhardt et al. |
| 8,993,488 | B2 | 3/2015 | Matza et al. |
| 10,112,853 | B2 | 10/2018 | Archer, III |
| 2013/0259743 | A1 | 10/2013 | Keasler et al. |
| 2014/0166289 | A1 | 6/2014 | Martinez et al. |
| 2014/0374104 | A1 | 12/2014 | Seth |
| 2015/0368137 | A1* | 12/2015 | Miller ................ C02F 1/78 210/638 |
| 2019/0047886 | A1 | 2/2019 | Archer, III |

FOREIGN PATENT DOCUMENTS

| | | |
|---|---|---|
| GB | 788559 A | 1/1958 |
| GB | 910661 A | 11/1962 |
| GB | 1122889 A | 8/1968 |

OTHER PUBLICATIONS

The Chemistry of Synthetic Dyes ed., K Venkataraman, p. 32, 1974.
Maeda, Yoshimichi, et al.; Treatment of sulfur dye waste waters. V. Oxidation of sodium sulfide by oxygen, Kogyo Yosui, 1967, pp. 60-67, vol. 106, Database: CAPLUS; Abstract Only.
Wolf, Friedrich, et al.; "Oxidation of sulfide ions by oxygen in the presence of sulfur dyes. II," Fortschritte der Wasserchemie und Ihrer Grenzgebiete, 1968, pp. 81-92, No. 10, Databse: CAPLUS; Abstract Only.
The Merck Index, Monograph No. M6107, (2013), via RSC.org.
Search Report for corresponding PCT/US2016/050336, dated Dec. 22, 2016.
Written Opinion for corresponding PCT/US2016/050336, dated Dec. 22, 2016.
U.S. Appl. No. 16/437,597; Office Action dated Aug. 29, 2019.

* cited by examiner

Primary Examiner — Lucas A Stelling
(74) Attorney, Agent, or Firm — Tristan A. Fuierer; Olive Law Group, PLLC

(57) ABSTRACT

A method for treating sulfide in an aqueous fluid comprises contacting the fluid with an oxidizer in the presence of a sulfur dye or sulfurized vat dye. In one embodiment, the method comprises treating sulfide contaminated water by contacting the contaminated water with air in the presence of a sulfur dye or a sulfurized vat dye. The method is useful for remediating industrial, agricultural, and municipal waste water.

7 Claims, No Drawings

METHOD FOR TREATING SULFIDES IN WASTE STREAMS

CROSS-REFERENCE TO RELATED APPLICATIONS

This application is filed under the provisions of 35 U.S.C. § 120 and is a continuation of U.S. patent application Ser. No. 16/165,010 filed on Oct. 19, 2018, now U.S. Pat. No. 10,315,940 issued on Jun. 11, 2019, which is a divisional of U.S. patent application Ser. No. 14/854,403 filed Sep. 15, 2015 in the name of William Moseley Archer III, now U.S. Pat. No. 10,112,853 issued on Oct. 30, 2018, which are hereby incorporated by reference herein in their entirety.

FIELD OF THE INVENTION

The present invention relates to the treatment of aqueous solutions comprising sulfides. More particularly, the present invention is a process for the treatment of sulfides in an aqueous solution wherein the aqueous solution comprising the sulfides is contacted with a sulfur dye. The present invention is useful for the remediation of sulfides found in natural and industrial aqueous waste streams, or waste water. More particularly, the waste water comprising sulfides can result from industrial operations such as animal waste processing, mining, ore refining, oil drilling, petroleum refining, natural gas processing, and hydraulic fracturing.

BACKGROUND

Sulfide is an unwanted component of many waste streams. It can occur naturally or as the result of industrial processes. It also is generated by the absorption of hydrogen sulfide in an aqueous liquid as is common in scrubber systems, particularly alkaline scrubbers. If the scrubber liquid is alkaline a portion of the hydrogen sulfide will be converted to dissolved bisulfide ($HS^-$) and sulfide ($S^{-2}$). The proportion of these species depends on the pH of the liquid. The term sulfide used in this invention includes all forms of inorganic sulfide including hydrogen sulfide, bisulfide ions, sulfide ions and polysulfide ions. If alkaline sulfide-bearing solutions are neutralized or acidified, soluble sulfides are converted to hydrogen sulfide, potentially off-gassing from the liquid. Hydrogen sulfide gas is malodorous and toxic. Liquids that contain sufficiently high levels of sulfide are classified by US EPA regulations as reactive hazardous wastes because of their potential to generate hydrogen sulfide when acidified. It is often desirable to remove or destroy sulfides present in aqueous fluids. One method of eliminating sulfides is to oxidize them to a new compound that is not malodorous or toxic.

Oxidation of sulfides in aqueous liquids can be accomplished chemically with oxidizing agents such as hydrogen peroxide, chlorine dioxide, hypochlorite salts, methylmorpholine-N-oxide, or nitrate/nitrites. These methods are effective but have drawbacks which can include high chemical costs, handling of hazardous chemicals and formation of unwanted by-products. Oxidation can be accomplished biologically, but this is usually expensive and can produce odors in the treatment units. A third method is oxidation with molecular oxygen in the presence of a catalyst. Sulfides may also be treated by other methods such as absorption or sequestering.

The most common catalyst for sulfide oxidation is a chelated metal catalyst, most particularly iron chelated by an aminopolycarboxylic acid. The normal product of oxidation with this catalyst in aqueous fluids is elemental sulfur which precipitates. The catalyst is typically regenerated with molecular oxygen, normally atmospheric air which can also degrade the catalyst. This method for oxidizing sulfides is not without drawbacks. It requires removal of solid elemental sulfur and replenishment of catalyst.

BRIEF SUMMARY OF THE INVENTION

The present invention provides an inexpensive alternative to the traditional treatment of sulfides by expensive chemicals or by oxygen catalyzed by chelated metal which creates a sulfur precipitate. It has been discovered that sulfur dyes and sulfurized vat dyes will oxidize sulfides dissolved in aqueous fluids when the fluid is contacted with oxygen, typically atmospheric air. The present invention uses small amounts of inexpensive dye as a means for oxidation of sulfides in the presence of oxygen or other oxidizers. Sulfur dyes and sulfurized vat dyes are stable under the highly alkaline conditions often associated with absorption or scrubbing of hydrogen sulfide from gaseous streams. Sulfide oxidation under alkaline conditions in the presence of sulfur dye is very simple and predominantly produces a non-toxic soluble by-product, thiosulfate. In many applications, the soluble nature of the treatment product will be an advantage.

In one embodiment, the present invention is a method for treating sulfide in an aqueous fluid comprising contacting the fluid with an oxidizer in the presence of at least one sulfur dye or sulfurized vat dye.

In a further embodiment, the present invention is a method for treating oilfield waste water. The method comprises contacting the oilfield wastewater with an oxidizer in the presence of at least one sulfur dye or sulfurized vat dye.

In a still further embodiment, the present invention is a method for treating sulfide produced by hydrogen sulfide absorption in an alkaline aqueous liquid to form an adsorption liquid comprising dissolved sulfides. The method comprises contacting the absorption liquid with at least one sulfur dye or sulfurized vat dye and concurrently or subsequently contacting the absorption liquid with an oxidizer to provide a treated liquid.

DETAILED DESCRIPTION OF THE INVENTION

The method can be operated over a wide range of conditions, including temperature, sulfide concentration, dye concentration, and oxygen input.

The rate of sulfide treatment is dependent, at least to some extent, on all four of these parameters. While a higher temperature will generally increase the reaction rate, a higher temperature will also tend to reduce the solubility of oxygen in water. Solubility of oxygen in water is increased by higher pressure. The optimum conditions for best economy depend greatly on the particular circumstances. Since the present invention has utility in a vast range of applications, the optimum conditions will vary widely also. The examples provided demonstrate the robust nature of this method over a wide range of conditions.

The process may be utilized in numerous waste water treatment applications. Addition of sulfur dye and introduction of oxygen to virtually any sulfide bearing aqueous solution will reduce the sulfide concentrations. Sulfide treatment systems can be set up to operate continuously or as batch processes. The method will have applications in oil field operations to reduce sulfide in waters associated with oil and gas production. In one embodiment, the sulfur dye is retained by filtration, ultrafiltration, or other means of separation to allow the treated water and soluble salts to be reused in the oilfield operation. The method of this invention may also be used in downhole treatment of sulfide bearing waters in oilfields.

In a very simple application, small amounts of sulfur dye added to waste water impoundments can provide very economical sulfide treatment where oxygen input is accomplished by surface transfer of atmospheric oxygen.

In one embodiment, the method can be incorporated into the absorption process for removing hydrogen sulfide from gaseous streams. Sulfur dye can be added directly to an aqueous absorption liquid having a pH greater than 7, where an oxidizer, typically comprising or containing oxygen or air, is added to the system. Preferably, the absorption liquid is sufficiently alkaline (having a pH greater than 9) to facilitate the absorption of hydrogen sulfide. Molecular oxygen, typically atmospheric air, can be added at any convenient place in the absorption system. A treatment unit may be operated at greater than atmospheric pressure to facilitate the dissolving or contacting of the oxygen in the aqueous absorption liquid. Under the alkaline conditions employed to absorb hydrogen sulfide into an aqueous liquid, it is believed that the primary products of the treatment with the sulfur dye are thiosulfates. The form of the thiosulfates are typically sodium or potassium thiosulfate depending on which alkali (such as: sodium hydroxide or potassium hydroxide) is used in the absorption liquid. Optionally, filtration, ultrafiltration or other means of separation can be used to separate the soluble products of the sulfide treatment from any insoluble sulfur dye that is retained by the separator. Sulfur dye compounds separated in this manner can be reused in the sulfide oxidation process.

The sulfur dyes and sulfurized vat dyes which may be used in accordance with the process of the invention include those which are either 1) provided in the non-reduced (oxidized) form (where sulfur atoms attached to the dye chromophore are predominantly connected to other chromophore units through disulfide or polysulfide linkages), 2) provided as pre-reduced (leuco) sulfur dyes (where sulfur atoms exist primarily as thiolate salts), or 3) provided as solubilized sulfur dyes where Bunte salt groups impart water solubility under non-reducing conditions.

Sulfurized vat dyes are chemically and structurally similar to sulfur dyes including having the disulfide/thiolate functionality. They are given the vat dye designation because they are typically dyed using a vat dye process.

Sulfur dyes and sulfurized vat dyes can be dissolved by reducing agents such as sodium sulfide, sodium dithionite or sodium hydrosulfide under alkaline conditions. This reduction breaks the disulfide bonds producing very polar thiolate groups (Dye-S$^-$). This form of the dye is called a Leuco Sulfur Dye. The oxidation/reduction of the sulfur atoms attached to the chromophore structure is reversible as follows:

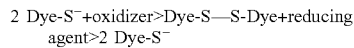
2 Dye-S$^-$+oxidizer>Dye-S—S-Dye+reducing agent>2 Dye-S$^-$

Sulfur dyes can also exist as a non-reduced, water soluble form characterized by thiosulfate groups attached to the chromophores (Dye-S—SO$_3^-$). This form is called a Bunte Salt and is categorized as a Solubilized Sulfur Dye. Solubilized Sulfur Dyes can be prepared by oxidative reaction of a sulfur dye with sulfite. Solubilized Sulfur Dyes will convert to one of the other dye forms when reacted with sulfides. Any of the three forms of sulfur dyes may be used in accordance with this method.

During sulfur dye production and dyeing processes, sulfides can undergo oxidation when leuco dyes are converted to the insoluble non-reduced (oxidized) form with air. However, this oxidation of sulfides has not been attributed to the presence of the dye. There is no evidence that anyone has recognized that the addition of sulfur dyes or sulfurized vat dyes will act as a catalyst for the treatment of unwanted sulfides in waste waters and other aqueous fluids. It has been discovered that these dyes, even in very low molar concentrations, will treat sulfides in aqueous fluids.

It is believed that the mechanism of the sulfide treatment of the present invention is that the sulfur dye in the non-reduced (oxidized) form reacts with sulfide in solution to oxidize the sulfide to a harmless compound, such as sodium thiosulfate. In reacting the sulfur dye in the sulfide treatment process, the sulfur dye is converted to the leuco (reduced) form of the dye. When the thus produced leuco form of the dye is contacted with oxygen or another suitable oxidizer, the leuco dye is restored to the non-reduced state ready to react with more sulfide. If the absorption liquid is contacted with a leuco form of the sulfur dye; it is required to simultaneously contact the absorption liquid with an oxidizer such as air to provide the sulfide treatment. While the exact structures and molecular weights of most sulfur dyes are not known, the molecular weight of an individual chromophore unit of Sulfur Black 1 is believed to be about 548 based on a common proposed structure. This molecular weight is about 14 times the weight of a sulfide ion. The method of this invention is demonstrated to be very effective at molar ratios of sulfur dye to sulfide that are less than 1 mole-%. More preferably, the molar ratio of sulfur dye to sulfide is effective at less than about 0.6 mole-%. This strongly supports that the dye used in this method acts as a catalyst to provide the sulfide treatment.

Sulfur dyes and sulfurized vat dyes which may be utilized in accordance with the method of the invention include but are not limited to the following ("C.I." stands for "Colour Index"):

C.I. Sulfur Yellow 1, 2, 3, 4, 5, 6, 8, 9, 10, 11, 12, 13, 14, 16, 20 and 23, C.I. Leuco Sulfur Yellow 2, 4, 7, 9, 12, 15, 17, 18, 21, 22 and 23 and C.I. Solubilized Sulfur Yellow 2, 4, 5, 19, 20 and 23;

C.I. Sulfur Orange 1, 2, 3, 4, 5, 6, 7 and 8, C.I. Leuco Sulfur Orange 1, 3, 5 and 9 and C.I. Solubilized Sulfur Orange 1, 3, 5, 6, 7 and 8;

C.I. Sulfur Red 1, 2, 3, 4, 5, 6, 7, 8, 9, 10, 12 and 13, C.I. Leuco Sulfur Red 1, 4, 5, 6, 11 and 14 and C.I. Solubilized Sulfur Red 3, 6, 7, 11 and 13;

C.I. Sulfur Violet 1, 2, 3, 4 and 5, C.I. Leuco Sulfur Violet 1 and 3 and C.I. Solubilized Sulfur Violet 1;

C.I. Sulfur Blue 1, 2, 3, 4, 5, 6, 7, 8, 9, 10, 11, 12, 13, 14, 15, 16, 17, 18 and 19, C.I. Leuco Sulfur Blue 1, 2, 3, 5, 7, 8, 9, 11, 13, 15 and 20 and C.I. Solubilized Sulfur Blue 1, 2, 4, 5, 6, 7, 10, 11, 13, and 15;

C.I. Sulfur Green 1, 2, 3, 4, 5, 6, 7, 8:1, 9, 10, 11, 12, 13, 14, 15, 16, 17, 18, 19, 20, 21, 22, 23, 24, 25, 26, 27, 28, 29, 31, 32 and 33, C.I. Leuco Sulfur Green 1, 2, 3, 4, 7, 11, 16 30, 34, 35, 36, and 37 and C.I. Solubilized Sulfur Green 1, 2, 3, 6, 7, 9, 19, 26, and 27;

C.I. Sulfur Brown 1, 2, 3, 4, 5, 6, 7, 8, 9, 10, 11, 12, 13, 14, 14:1, 15, 15:1, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53:1, 54, 55, 56, 57, 58, 59, 60, 61, 62, 63, 64, 65, 66, 67, 68, 69, 70, 71, 72, 73, 74, 76, 77, 78, 79, 84, 85, 87, 88, 89, 90, 91, 93, and 94;

C.I. Leuco Sulfur Brown 1, 3, 4, 5, 8, 10, 11, 12, 14, 15, 21, 23, 26, 31, 37, 43, 44, 81, 82, 86, 87, 90, 91, 92, 93, 94, 95 and 96 and C.I. Solubilized Sulfur Brown 1, 4, 5, 8, 10, 11, 12, 14, 15, 16, 21, 26, 28, 31, 51, 52, 56, 60, 75, 80, and 83;

C.I. Sulfur Black 1, 2, 3, 4, 5, 6, 7, 8, 9, 10, 11, 12, 13, 14, 15, 16 and 17;

C.I. Leuco Sulfur Black 1, 2, 6, 9, 10, 11, and 18;

C.I. Solubilized Sulfur Black 1, 2, 5, 7, and 11; and,

C.I. Vat Yellow 21, C.I. Vat Orange 21, C. I Vat Green 7, C.I. Vat Blue 7, 42, 43, Vat Black 11.

A more complete listing of the sulfur dyes and sulfurized vat dyes mentioned hereinabove may be found in the Colour Index, 3rd. Ed., issued by the Society of Dyers and Colourists (London, GB), as well as in the supplementary volumes published thereto and in the Colour Index International, 4$^{th}$ Edition Online which are hereby incorporated by reference.

At least one sulfur dye or sulfurized vat dye listed hereinabove is used to treat aqueous sulfides in the process of the instant invention. More preferably, at least one of C.I. Sulfur Black 1, C.I. Leuco Sulfur Black 1 and C.I. Solubilized Sulfur Black 1 is utilized in accordance with the process to treat sulfides based on economics and availability.

Compounds other than those listed by Colour Index International may exist or be synthesized which chemically qualify as sulfur dyes or sulfurized vat dyes and may be utilized in accordance with the method of this invention. Such compounds might not possess a sufficiently desirable color or fastness to be offered as a dye, yet perform acceptably in the method of this invention. The terms "sulfur dye" and "sulfurized vat dye" as used in this invention include compounds comprised of monocyclic aromatic, heteroaromatic, or quinoid chromophore units; or polycyclic aromatic, heteroaromatic, or quinoid chromophore wherein said chromophore units are connected by disulfide or polysulfide linkages when in the non-reduced form. Sulfur dyes and sulfurized vat dyes can be converted to the reduced (or leuco) form by reaction with reducing agents such sodium sulfide, sodium dithionite or sodium hydrosulfide. This reaction cleaves the disulfide linkages of the non-reduced (oxidized) dye to form thiolate functional groups (dye-S$^-$). This conversion between disulfide and thiolate functionality is reversible.

A series of examples was developed and carried out to explore the concept of the method for treating aqueous solutions containing sulfides by contacting the aqueous solution containing the sulfide with a sulfur dye or sulfurized vat dye. It was discovered that the concentration of sulfide in the aqueous sulfide solutions could be reduced by more than 90 percent on the basis of the weight of the sulfide present in the aqueous sulfide solution. More preferably, the concentration of sulfide in the aqueous sulfide solutions could be reduced by more than 95 percent on the basis of the weight of the sulfide present in the aqueous sulfide solution. Most preferably, the concentration of sulfide in the aqueous sulfide solutions could be reduced by more than 96, 97, 98, 99, or 99.5 percent on the basis of the weight of the sulfide present in the aqueous sulfide solution. The process of the present invention was demonstrated over a reaction temperature range of from about 1° C. to about 100° C. More preferably, the process of the present invention can be carried out over a reaction temperature of from about 4° C. to about 80° C. Most preferably, the process of the present invention can be carried out over a reaction temperature of from about 20° C. to about 50° C. The sulfur dye was dissolved in aqueous sulfide solutions in sulfur dye concentrations ranging from about 10 to about 1200 mg/l. These dye concentrations are based on the concentration of commercial dye products which contain less than 100% active dye ingredient. Over the entire range of aqueous sulfide solutions having a concentration of sulfide from about 100 to about 5000 mg/l, it was found that the addition of sulfur dye or sulfurized vat dye resulted in a greater than 96 weight percent reduction of the sulfide in the aqueous sulfide solutions within a treatment time ranging from about 30 minutes to about 120 minutes. When using Sulfur Black 1 as the sulfur dye, the reduction of the sulfide concentration ranged from about 97 to about 99.6 weight percent based on the initial amount of sulfide in the aqueous sulfide solution to be treated, reducing the final concentration of sulfide from as high as about 5000 mg/l to as low as less than about 1 mg/l sulfide in the treated effluent. Table 1 shows a summary of the results of experiments related to the reduction of sulfides in aqueous solutions using sulfur dyes and sulfurized vat dyes compared to a reference case (Zero) wherein no sulfur dye or sulfurized vat dye was added to the aqueous sulfide solution.

TABLE 1

Comparison of Sulfide Treatment with Sulfur Dyes and Sulfurized Vat Dyes

| Ex. No. | Dye | Dye Conc. mg/l | Temp ° C. | Sulfide Initial (mg/l) | Sulfide Final (mg/l) | Treatment Time (Min) | Reduction % |
|---|---|---|---|---|---|---|---|
| Zero | None | 0 | 43-46 | 500 | >490 | 120 | <2 |
| 1 | Sulfur Black 1 | 251 | 43-46 | 478 | <1 | 50 | 99.6 |
| 2 | Sulfur Black 1 | 250 | 4-6 | 250 | <5 | 120 | >98 |
| 3 | Sulfur Black 1 | 250 | 78-80 | 250 | <1 | 30 | >99.6 |
| 4 | Sulfur Black 1 | 10 | 42-45 | 100 | 3 | 30 | 97 |
| 5 | Sulfur Black 1 (reused) | 247.5 | 50 | 495 | 6 | 105 | 98.8 |
| 6 | Leuco Sulfur Brown 37 | 1200 | 45-48 | 500 | <20 | 60 | >96 |
| 7 | Leuco Vat Blue 43 | 1200 | 44-45 | 500 | <2.5 | 60 | >99.5 |
| 8 | Sulfur Black 1 | 500 | 40-45 | 5000 | 20 | 75 | 99 |

EXAMPLES

The following examples are intended to demonstrate the wide range of conditions under which sulfur dyes and sulfurized vat dyes are effective in treating sulfide when an oxidizer (in these examples air) is introduced into the aqueous fluid which contains the sulfide.

Example Zero+Control without Dye

A 1000 mg/l stock sulfide solution (as S$^{-2}$) was made by dissolving 1.503 grams of sodium sulfide nonahydrate in distilled water and diluting it to 250 milliliters. A 100 milliliter sample of 500 mg/l sulfide test solution was made by diluting 50 milliliters of the stock solution to 100 milliliters with distilled water. An aliquot was taken from the sulfide test solution for analysis under buffered pH and ionic strength conditions using a sulfide specific ion electrode calibrated using freshly prepared sulfide standards. (This method of analysis was used for all sulfide analyses in the examples.) The test solution was stirred and heated to 45° C., at which time an air sparge through a diffuser was initiated. The stirred and aerated test solution was maintained at a temperature of 45+/−2° C. Samples were withdrawn for analysis every 30 minutes for 2 hours. A decrease in sulfide concentration of less than 2% relative to the initial sulfide concentration of 500 mg/l was observed after two hours, demonstrating that the sulfide concentration was not markedly affected by the test conditions.

Example 1—C. I Sulfur Black 1

While the initial test of Example Zero was underway, a 1% solution of C.I. Sulfur Black 1 product was prepared by diluting 1 gram of C.I. Sulfur Black 1 to 100 milliliters with distilled water while stirring and heating to 80° C. A 1.8 milliliter portion of the 1% solution was added to the remaining 70 milliliters of test solution from Example Zero to produce a calculated sulfide concentration of 478 mg/l and a Sulfur Black 1 product concentration of 251 mg/l. The test solution was maintained at the same test conditions of temperature, stirring and air sparging as the control in Example Zero. After 30 minutes of sparging, the sulfide concentration in the test sample of Example 1 had decreased to less than 10 mg/l. After 50 minutes the sulfide concentration in the test sample of Example 1 had dropped to less than 2 mg/l; a reduction of approximately 99.6% relative to the initial sulfide concentration of 478 mg/l.

Example 2—C.I. Sulfur Black 1

A test solution containing 250 mg/l sulfide and 250 mg/l of C.I. Sulfur Black 1 product was made by diluting 25 milliliters of the 1000 mg/l sulfide stock solution prepared in Example Zero with 72.5 milliliters of distilled water. The test solution of Example 2 was cooled to 5° C., and then 2.5 milliliters of the 1% Sulfur Black 1 solution prepared in Example 1 was added. The test solution of Example 2 was stirred and sparged with air as in Example 1, while maintaining the test solution of Example 2 at a temperature in the range of 4-6° C. with an ice bath. After 120 minutes a sample of the test solution of Example 2 was collected, and determined to have a sulfide concentration of less than 5 mg/l. This resulted in a reduction of sulfide content by about 98% relative to the initial sulfide concentration of 250 mg/l.

Example 3—C.I. Sulfur Black 1

This test used similar test conditions to Example 2. A test solution containing 250 mg/l sulfide and 250 mg/l of Sulfur Black 1 product was heated to 80° C. at which time air sparging was initiated. After 15 minutes of sparging the sulfide concentration had decreased to approximately 5 mg/l and after 30 minutes, the sulfide concentration had decreased to less than 1 mg/l, a reduction of over 99.6% relative to the initial sulfide concentration of 250 mg/l.

Example 4

This test was performed under similar conditions to Example 1 except that the initial sulfide concentration was 100 mg/l and the sulfur dye product concentration was 10 mg/l. After air sparging for 30 minutes at a temperature of 42-45° C., the sulfide concentration had decreased to less than 3 mg/l. This represents a reduction in the sulfide concentration of about of 97% relative to the initial sulfide concentration of 100 mg/l.

Example 5—C.I. Sulfur Black 1

This example demonstrates that the dye component can be reused. After treating a test solution of 500 mg/l sulfide and 250 mg/l Sulfur Black 1 by air sparging at 50° C. to a final sulfide concentration of less than 1 mg/l, the used mixture was replenished with sulfide and re-treated. A 1.75 milliliter portion of 5% sulfide was added to 175 milliliters of used sulfur dye test mixture producing calculated concentrations of 495 mg/l sulfide and 247.5 mg/l sulfur black product. This replenished mixture was stirred and sparged at 50° C. for 105 minutes resulting in a final sulfide concentration of approximately 6 mg/l, a 98.8% reduction in sulfide concentration relative to the initial sulfide concentration of 495 mg/l.

Example 6—C.I. Leuco Sulfur Brown 37

This test was similar to previous tests except a sulfur dye product containing C.I. Leuco Sulfur Brown 37 was used to treat the sulfide solution instead of C.I. Sulfur Black 1. A solution of C.I. Leuco Sulfur Brown 37 dye was made by diluting 6 grams of DIRESUL Brown RDT-GS liq 150, a liquid dyestuff solution of C.I. Leuco Sulfur Brown 37 dye (Available from Archroma U.S., Inc., Charlotte, N.C.) to 50 milliliters with distilled water. A 500 mg/l sulfide test solution was prepared by diluting 50 milliliters of 1000 mg/l stock sulfide solution to 99 milliliters. This solution was heated to 45° C. and 1 milliliter of the diluted Brown dye was added to produce a solution containing 1200 mg/l of formulated dye product. The solution was stirred and sparged as in previous examples. After 30 minutes the sulfide level had dropped by approximately 90%. After 60 minutes the sulfide concentration was less than 20 mg/l, a greater than 96% reduction in sulfide concentration relative to the initial sulfide concentration of 500 mg/l.

Example 7—C.I. Leuco Vat Blue 43

This test was similar to previous tests except a dye product containing C.I. Leuco Vat Blue 43 was used to treat the sulfide solution. A solution of C.I. Leuco Vat Blue 43 dye was made by diluting 12 grams of DIRESUL Navy RDT-GF 1 liq dyestuff product (Available from Archroma U.S., Inc., Charlotte, N.C.) to 100 milliliters with distilled water. A 500 mg/l sulfide test solution was prepared by diluting 50 milliliters of 1000 mg/l stock sulfide solution to 99 milliliters. This solution was heated to 45° C. and 1 milliliter of diluted Navy dye was added to produce a solution containing 1200 mg/l of formulated dye product. The solution was stirred and aerated as in previous examples. After 30 minutes the sulfide level had dropped by more than 98% to less than 10 mg/l. After 60 minutes the sulfide concentration was less than 2.5 mg/l, a greater than 99.5% reduction in sulfide concentration relative to the initial sulfide concentration of 500 mg/l.

Example 8—C.I. Sulfur Black 1

A test sulfide solution was made by dissolving 3.745 grams of sodium sulfide nonahydrate in distilled water and diluting to a total volume of 99 milliliters. This solution was heated to 45° C. One milliliter of 5% C.I. Sulfur Black 1 solution was then added to produce a test solution of 5000 mg/l sulfide and 500 mg/l Sulfur Black 1. The test solution was stirred and sparged with air while maintaining the test solution temperature in the 40-45° C. range. After 75 minutes a sample was collected and determined to have a sulfide concentration of slightly less than 50 mg/l, a reduction of approximately 99% relative to the initial sulfide concentration of 5000 mg/l.

I claim:

1. A method for treating sulfides in a waste water impoundment comprising:
   introducing at least one sulfur dye or sulfurized vat dye to the waste water impoundment;
   contacting the waste water with oxygen to oxidize the sulfides to soluble sulfur-containing salts, wherein at least a portion of said oxygen is supplied by surface transfer of atmospheric oxygen, thus providing a treated water having a reduced concentration of sulfides relative to the waste water; and
   separating the soluble sulfur-containing salts from the at least one sulfur dye or sulfurized vat dye in the treated water.

2. The method of claim 1, wherein said sulfides are selected from the group consisting of hydrogen sulfide, bisulfide ions, sulfide ions, polysulfide ions and mixtures thereof.

3. The method of claim 1, wherein said sulfur dye is selected from the group consisting of Sulfur Black 1, Leuco Sulfur Black 1, Solubilized Sulfur Black 1 and mixtures thereof.

4. The method of claim 1, wherein the oxidation of the sulfides occurs under alkaline conditions.

5. The method of claim 1, wherein the sulfur dye or sulfurized vat dye separated from the treated water is reused.

6. The method of claim 5, wherein the separation can be effectuated using filtration or ultrafiltration.

7. The method of claim 1, wherein the treatment operates continuously or as batch processes.

* * * * *